Sept. 19, 1950 M. J. DI TORO 2,522,706

MULTIPLE-REFLECTING TIME-DELAY SYSTEM

Filed Aug. 23, 1946 2 Sheets-Sheet 1

INVENTOR.
MICHAEL J. Di TORO
BY Harry B. Page
ATTORNEY

Sept. 19, 1950 M. J. DI TORO 2,522,706

MULTIPLE-REFLECTING TIME-DELAY SYSTEM

Filed Aug. 23, 1946 2 Sheets-Sheet 2

INVENTOR.
MICHAEL J. Di TORO

BY Harry C. Page
ATTORNEY

Patented Sept. 19, 1950

2,522,706

UNITED STATES PATENT OFFICE 2,522,706

MULTIPLE-REFLECTING TIME-DELAY SYSTEM

Michael J. Di Toro, Brooklyn, N. Y., assignor to Hazeltine Research, Inc., Chicago, Ill., a corporation of Illinois Application August 23, 1946, Serial No. 692,533

2 Claims. (Cl. 178—44)

Figure 1:
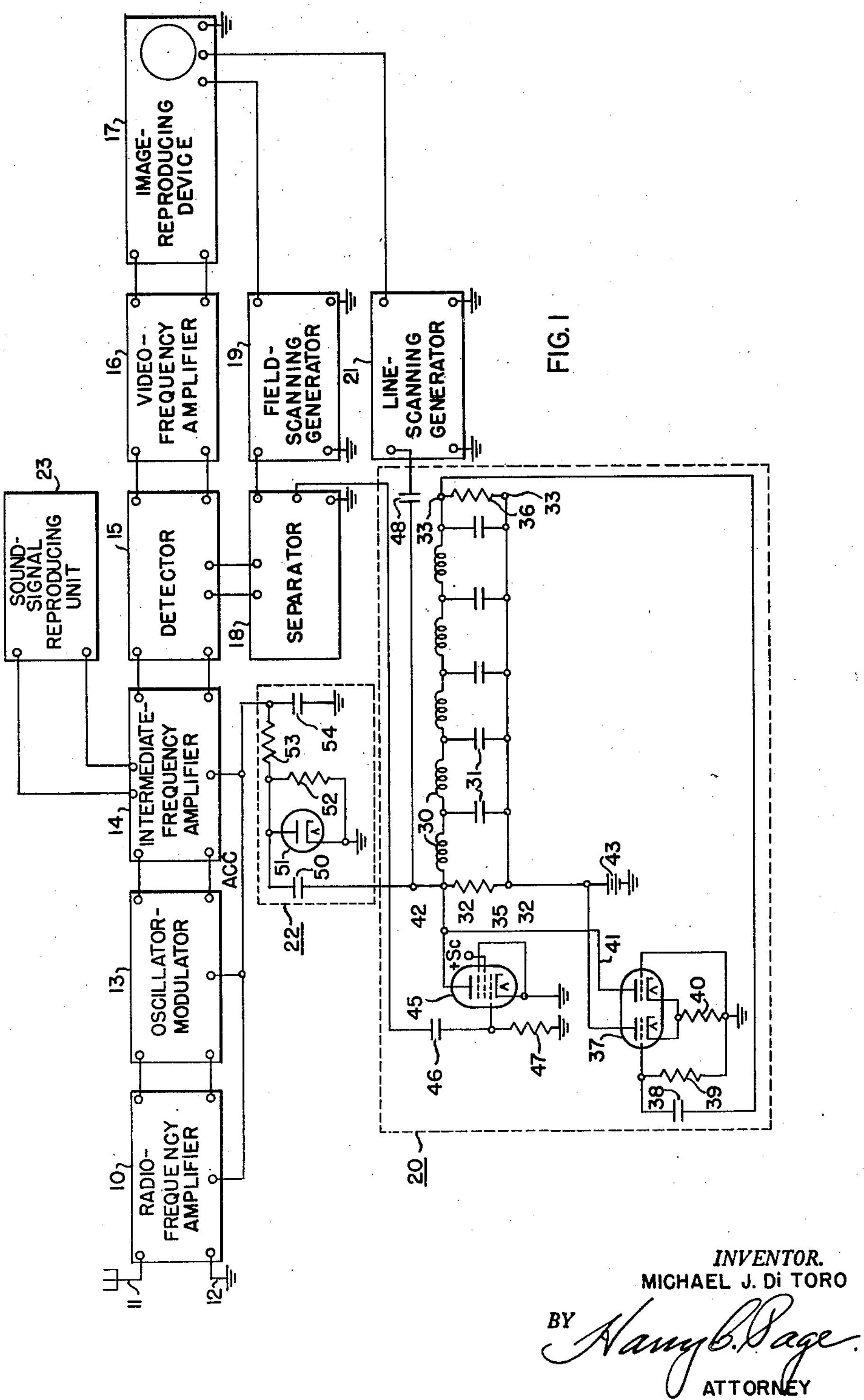

This invention relates, in general, to systems for translating recurring signal pulses of a fixed period and for distinguishing such pulses from signals not harmonically related thereto. Although the invention is subject to a wide variety of applications, it is especially suited for inclusion in the synchronizing-signal-separating apparatus conventionally incorporated into present-day television-receiving systems. In the material to follow, this particular use is considered in detail.

The separating apparatus of such a receiver is intended to delete all undesired or spurious pulses, noise and static from an applied composite television signal and to deliver only its desired synchronizing pulses to the scanning system. Many arrangements, featuring the use of time-delay networks, for accomplishing this result have been introduced into the art. For example, it has been proposed to provide a periodic wave repeater comprising a vacuum tube normally biased substantially to cutoff and having input and output circuits, one of which serves as a sensitivity control circuit for the tube. A time-delay network is coupled to the sensitivity control so that when a desired output pulse is obtained from the repeater, an input pulse is applied to the delay network. This latter pulse is delayed and subsequently applied to the sensitivity control circuit with such polarity as to sensitize the tube for operation at the time a succeeding output pulse is due. Repeaters of this type may not be entirely effective in cleaning all unwanted frequency components from an applied television signal especially where spurious pulses of unusually high amplitude are present.

A different type of prior separator comprises a degenerative amplifier having a reflecting delay line in the cathode circuit to control degeneration. When employed to discriminate in favor of the line-frequency pulses of an applied composite television synchronizing signal, the line is short-circuited at its far end and has a round-trip delay equal to the line period. As a consequence, the amplifier has little degeneration for the line pulses but is highly degenerative for all signals of different periods. The arrangement here proposed utilizes a regenerative time-delay network further to improve the discrimination and make the signal separation more complete.

It is an object of the present invention, therefore, to provide a system for translating and discriminating in favor of recurring signal pulses of a fixed period which avoids one or more of the above-mentioned limitations of prior arrangements.

It is another object of the invention to provide an improved signal-translating system, featuring the use of a time-delay network, for translating recurring signal pulses of a given period and for distinguishing such pulses from signals not harmonically related thereto.

It is a specific object of the invention to provide an improved system for translating a television signal and for separating synchronizing pulses thereof which have a fixed period.

In accordance with the invention, a system for translating recurring signal pulses having a given period and for distinguishing such pulses from signals not harmonically related thereto comprises a multiple-reflecting time-delay network having a predetermined characteristic impedance and having a one-way delay equal to $1/n$ times the aforesaid period, where $n$ is an even integer. The system has an impedance device exhibiting negative-resistance properties, having a nominal value of impedance different from the characteristic impedance of the network, and providing a termination at one end of the network for compensating, at least in part, signal attenuation therein. Further, means are provided for applying the recurring pulses to the network for translation and means are coupled to the network for deriving an output signal, including the recurring pulses with exalted amplitude. "Image" is used throughout this description to denote an output signal obtained from a time-delay network in response to an applied pulse, the image having the same wave form as the original pulse except for the distortion which may be inherent in the network.

For a better understanding of the present invention, together with other and further objects thereof, reference is had to the following description taken in connection with the accompanying drawings, and its scope will be pointed out in the appended claims.

Figure 3:
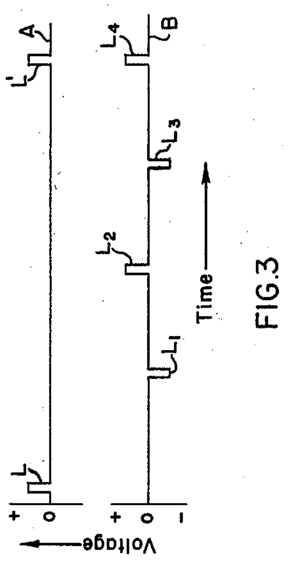
Figure 5:
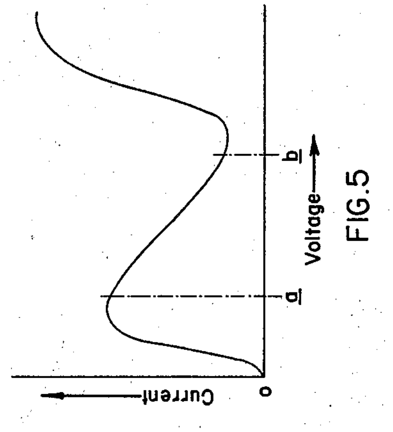
Figure 2:
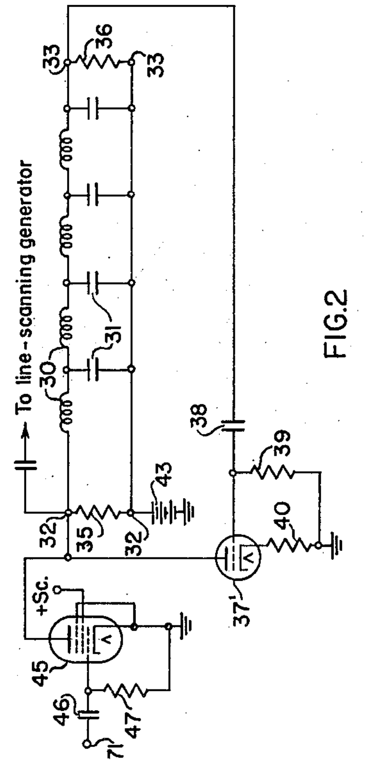
Figure 4:
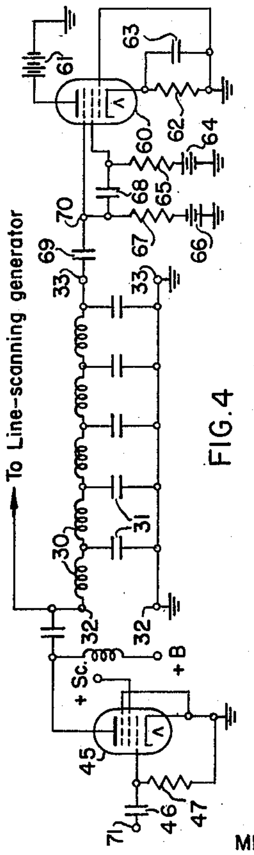

In the drawings, Fig. 1 is a schematic representation of a complete television wave-signal receiver including an arrangement for selecting recurring pulse signals; Fig. 2 represents a modified form of the pulse-selecting arrangement of Fig. 1; Fig. 3 comprises graphs used in explaining the operation of the Fig. 2 modification; Fig. 4 represents a pulse-selecting or translating arrangement in accordance with the invention claimed in this application; and Fig. 5 is a curve designating an operating characteristic of one component of the Fig. 4 arrangement.

Referring now more particularly to Fig. 1, the television carrier-wave-signal receiver there represented is of the superheterodyne type and includes a radio-frequency amplifier 10 of any desired number of stages, having its input circuit connected to an antenna-ground system 11, 12. Coupled in cascade with the output circuit of radio-frequency amplifier 10, in the order named, are an oscillator-modulator 13, an intermediate-frequency amplifier 14 of one or more stages, a wave-signal detector 15, a video-frequency amplifier 16 of one or more stages, and an image-reproducing device 17 which may be of the cathode-ray tube type. A synchronizing-signal separator 18 is also coupled to an output circuit of detector 15. Its output circuit is directly connected to a field-scanning generator 19 and is coupled by way of an intersynchronizing-signal separator 20, to be described more particularly hereinafter, to a line-scanning generator 21. The output circuits of scanning generators 19 and 21 are connected to scanning elements of the reproducing device 17 in conventional manner. An automatic-contrast-control (ACC) detector 22 is coupled to an output circuit of intersynchronizing-signal separator 20 while its output circuit is connected to the input circuits of one or more of the tubes of radio-frequency amplifier 10, oscillator-modulator 13, and intermediate-frequency amplifier 14 in well-known manner.

A sound-signal reproducing unit 23 is also connected to an output circuit of intermediate-frequency amplifier 14. It may have stages of intermediate-frequency amplification, a sound-signal detector, stages of audio-frequency amplification and a sound-reproducing device.

It will be understood that the various units thus far described, with the exception of intersynchronizing-signal separator 20, may be of any conventional design and construction. The details of such components are well known in the art rendering a further detailed description thereof unnecessary.

Considering briefly the operation of the receiver as a whole and assuming for the moment that unit 20 is a conventional intersynchronizing-signal separator, a desired modulated carrier-wave television signal is intercepted by antenna system 11, 12. The signal is selected and amplified in radio-frequency amplifier 10 and applied to oscillator-modulator 13 wherein it is converted into an intermediate-frequency signal. The intermediate-frequency signal is selectively amplified in amplifier 14 and supplied to detector 15 where its modulation components are derived. These components, which comprise video-frequency as well as synchronizing-signal components, are amplified in video-frequency amplifier 16 and thereafter applied to the brilliancy-control electrode of the cathode-ray tube included in reproducing device 17 to modulate the intensity of the beam thereof in accordance with the video-frequency modulation. The synchronizing-signal components or pulses of the received signal are separated from the video-frequency content in separator 18 and are used to synchronize the operation of line-scanning and field-scanning generators 21 and 19, respectively. These generators supply scanning signals of saw-tooth wave form which are properly synchronized with reference to the received television signal and applied to the deflecting elements of image-reproducing device 17, thereby to deflect the cathode-ray beam thereof in two directions normal to each other to reproduce the received television image. An automatic-contrast-control or ACC signal derived in unit 22 from an applied signal to be pointed out subsequently is effective to control the amplification of one or more of units 10, 13 and 14 to maintain the signal input to detector 15 and to the sound-signal reproducing unit 23 within a relatively narrow range for a wide range of received signal intensities.

The sound-signal modulated-carrier wave accompanying the desired television modulated-carrier wave is concurrently intercepted by antenna system 11, 12. After selective amplification in radio-frequency amplifier 10, it is applied to oscillator-modulator 13 and converted into a sound-modulated intermediate-frequency signal. The sound-modulated intermediate-frequency signal is delivered to unit 23 wherein it is amplified and detected to derive the sound-modulation components which are further amplified and reproduced by the sound-reproducing device.

Referring now more particularly to the intersynchronizing-signal separator 20, this unit may be thought of as a system for translating recurring signal pulses having a given period and for distinguishing such pulses from signals not harmonically related thereto. As utilized in the embodiment under consideration, the system is to translate and discriminate in favor of the line-synchronizing pulses which recur with a fixed periodicity in a composite television signal conforming to the standards of the Federal Communications Commission accepted and followed in commercial television broadcasting. The system comprises a time-delay network which, in response to the translation of any pulse therethrough, effectively applies to the network a delayed image having the same phase as the original pulse but a time delay equal to the period of the line-synchronizing pulses. The expression "the original pulse" is intended to mean the signal or disturbance at the input end of the network which gives rise to the delayed image. A network having this characteristic, namely being effective to reapply a delayed image of an original pulse, may be constructed as a properly terminated network with an external feed-back connection from its remote to its near end or it may take the form of a multiple reflecting network. While both types are to be discussed, the one represented in Fig. 1 corresponds to the first-mentioned type.

As illustrated, the time-delay network comprises a plurality of serially connected inductors 30, 30 and intermediate shunt-connected condensers 31, 31 arranged in the manner of a ladder-type delay network. The total time delay of such a network is determined by its total series inductance and total shunt capacitance. The near or input end of the network has input terminals 32, 32 while the remote or far end has terminals 33, 33. A resistor 35 is connected to input terminals 32, 32 and a resistor 36 is connected to output terminals 33, 33. Preferably, the values of these resistors are selected properly to terminate each end of the network in its characteristic impedance so that the arrangement may be considered as having nonreflecting terminations.

A feed-back connection extending from the remote to the near end of the network is provided for applying delayed images of translated signals back to the network, as indicated above. The feed-back circuit comprises regenerative means associated with the time-delay network for compensating, at least in part, signal attenuation therein so that the network has a very low decrement. The regenerative means is provided by a two-stage amplifier including the duo-triode vacuum tube 37. A coupling condenser 38 and grid-leak resistor 39 couple the input electrodes of one section of tube 37 to the remote end of the network 30, 31. A cathode resistor 40, common to the cathode elements of both sections of the tube, interconnects these sections and serves to stabilize the gain of the amplifier. The second section is operated as a grounded-grid amplifier, having its control electrode directly connected to ground. The output circuit of this section is connected over conductors 41, 42 to the near end of the network 30, 31. The anode elements of both sections of the tube are connected to a source of space current, shown as a battery 43, one section being directly connected with the positive terminal of the battery and the other being connected to the same terminal through the network 30, 31.

The system or intersynchronizing-signal separator 20 also has means for applying a television signal including recurring line-synchronizing pulses to the network 30, 31. This means is shown as an amplifier, including a tube 45 of the pentode type. A condenser 46 and resistor 47 connect the input electrodes of this tube to the high-potential output terminal of separator 18. The output electrodes of the tube are connected to the near end of network 30, 31 and, through the network, to the space-current supply 43. A coupling condenser 48, connected between the input end of network 30, 31 and the input circuit of line-scanning generator 21, constitutes means coupled to the network for deriving an output signal for application to the line-scanning generator.

A second output from unit 20 is applied by way of a condenser 50 to a conventional ACC detector system, comprising a diode 51, a load resistor 52 and a filter arrangement of a resistor 53 and shunt condenser 54. The circuit of diode 51 is arranged in well-known manner for peak detection. An ACC potential established in the load circuit of this detector is applied over the ACC conductor to units 10, 13 and 14.

In considering the operation of intersynchronizing-signal separator 20, it will be understood that the parameters of the network 30, 31 are selected to establish therein a one-way delay equal to the period of the line-synchronizing pulses. That is to say, the inductance and capacitance components employed introduce a delay in signal translation from input terminals 32, 32 to output terminals 33, 33 which is equal to the time separation of succeeding line-synchronizing pulses of the received television signal. It will be assumed that the amplification of stage 37 is adjusted so that, for sustained operation, the loop circuit from input terminals 32, 32, through the network 30, 31, through stage 37 and back to the input terminals 32, 32 is slightly dissipative. In other words, it will be assumed that the over-all gain of this loop circuit under a condition of continuous response to applied repeating line-synchronizing pulses is slightly less than unity. It will further be assumed that the composite synchronizing signal from separator 18, which has both line-frequency and field-frequency pulses but no video-frequency components, is applied to the input circuit of tube 45 with negative polarity.

For the assumed conditions, an applied line-synchronizing pulse is repeated by tube 45 and applied to the near end or terminals 32, 32 of network 30, 31 with positive polarity. This signal is translated along the network but suffers a certain amount of attenuation in its traverse thereof. Upon reaching the remote end, it is completely absorbed in the terminating resistor 36 but produces a signal variation of positive polarity, representing the translated pulse, in the input circuit of the first section of amplifier 37. This first section constitutes a cathode follower while the succeeding section is a cathode-driven grounded-grid amplifier.. Consequently, an amplified pulse also of positive polarity appears in the output circuit of the last section and is thus applied to the near end of network 30, 31. This amplified pulse constitutes a regenerated image of the original translated pulse. It has the same polarity as the original pulse and is reapplied to the near end of the delay network with a time delay equal to the period of the line-synchronizing pulses. Therefore, it is applied simultaneously with the next succeeding line-synchronizing pulse of the composite television signal delivered to unit 20 from separator 18. The two concurrently applied pulses, being of like polarity and occurring in time coincidence, are added at the input terminals of the network to produce a single pulse having a greater amplitude than either of its components. This single pulse is translated through the network and around the loop in a similar manner to recombine with the third line-synchronizing component of the composite television synchronizing signal. In this fashion, the time-delay network with its regenerative feed-back circuit effectively pyramids or regenerates the repeating line-synchronizing pulses applied to unit 20.

As already stated, the gain and operating conditions of amplifier 37 are selected to establish a response to the recurring line-synchronizing pulses in which the amplitude of any delayed image applied by the amplifier to the near end of the time-delay network is only slightly less than the amplitude of the original signal or disturbance which was translated through the network to give rise to the particular delayed image. The output signal supplied through condenser 48 to the line-scanning generator 21 for conventional synchronizing of this generator includes the line-synchronizing pulses of the received signal with exalted or greatly increased amplitude. For the most part, the only components of the synchronizing signal applied to unit 20 which have a period equal to the delay of the network 30, 31 are the desired line-synchronizing pulses. Therefore, it is only these pulses which experience the maximum amplitude gain. Noise, spurious signals, and the field-frequency pulses usually have periods quite different from the one-way delay of the network and while they give rise to images reapplied over the feed-back circuit to the network terminals 32, 32, their images do not effect a cumulative amplitude gain of such undesired signals. For this reason, the intersynchronizing-signal separator 20, while greatly augmenting the amplitude of the desired line-synchronizing pulses, discriminates against undesired pulses which are not harmonically related to the line pulses. By the utilization of an amplitude-selective synchronizing circuit in line-scanning generator 21, this generator may be caused to be synchronized only in response to the line-frequency pulses.

The output signal from unit 20, supplied through condenser 50 to the ACC detector 22, is also relatively free of all pulse signals other than those occurring at the line frequency. This signal is said to be relatively void of the undesired pulses since the desired line-frequency pulses greatly exceed all others in amplitude. The ACC detector is, therefore, primarily responsive only to the line pulses and the time constant of its filter 53, 54 may be relatively short. This permits the detector to have a fast recovery time so that it is not paralyzed for any appreciable interval in the event that a spurious signal is applied thereto. Additionally, its input signal for the usual operation contains no spurious signals which are comparable in amplitude to the line-frequency pulses.

In some installations where space requirements dictate the use of apparatus of small physical size the modified form of intersynchronizing-signal separator of Fig. 2 may be found particularly desirable. Essentially, it is the same type of system as that shown in Fig. 1 and like components thereof are designated by the same reference characters. In this modified form, however, the time-delay network 30, 31 has a one-way delay equal to one-quarter of the time separation of line-synchronizing pulses. The only other significant difference lies in the regenerative feed-back circuit from the remote to the near end of the delay network which in this case, is a single stage amplifier 37'.

The operation of the Fig. 2 arrangement will be apparent from the foregoing material in view of the curves shown in Fig. 3. Curve A represents the line-synchronizing pulses applied to the input terminals of the time-delay network 30, 31, two such pulses, L, L' being illustrated. Consider for a moment the response of the network to the first of these pulses alone. The applied pulse, upon arriving at the remote termination of the network, is reapplied through amplifier 37' to the near end with negative polarity, as indicated by the pulse component $L_1$ of curve B. The reapplied pulse $L_1$, in turn, traverses the loop circuit to be reapplied with a further polarity reversal and with a further time delay, as shown by pulse component $L_2$ of curve B. The components $L_3$ and $L_4$ designate still additional images occasioned by the first applied line-synchronizing pulse L. These images occur with alternate polarity and with a time separation equal to one-quarter of the line period. Hence, the fourth image $L_4$ is applied to the near end of the network in time coincidence with and with the same polarity as the next succeeding line-synchronizing pulse L'. These components add, thereby producing an amplitude gain and causing the line-synchronizing pulses to be favored by the separator in the same manner as pointed out in connection with the operation of the Fig. 1 arrangement. The modified form of Fig. 2 may be substituted for unit 20 of Fig. 1 by connecting its input terminal 71 to the high-potential output terminal of separator 18 and by deriving an output signal from terminal 32 for application to the line-scanning generator, as indicated by the arrow. Other separating systems, utilizing a reflecting network of the same delay are disclosed in application Serial No. 685,110, filed July 20, 1946, in the name of Alan Hazeltine and in application Serial No. 696,156, filed September 11, 1946, in the name of Arthur V. Loughren. Both applications referred to are assigned to the same assignee as the present invention.

As previously mentioned, the time-delay network may have a feed-back circuit as shown in Figs. 1 and 2 or it may be terminated for multiple-reflection phenomena in order to provide signal images. Where a multiple-reflecting network is employed, signal attenuation therein may be compensated in accordance with the invention claimed herein by a two-terminal impedance device exhibiting negative-resistance properties and used as a termination for the network. Such devices fall into two well-defined classes. In one, termed a "voltage-controlled negative resistance," the device is responsive to voltage applied across its terminals while in the other, designated as of the "current-controlled" type, the device is responsive to current. The selection as between these types is governed by the nature of the termination desired at the end of the time-delay network to which the device is to be connected. For example, an open-circuited termination, which represents a condition of voltage maximum and current minimum requires the use of a negative-resistance device of the voltage-controlled type. On the other hand, where the network is to be terminated in a short circuit, which is a high-current but low-voltage termination, a negative-impedance device of the current-controlled type should be used for the termination. In practicing this invention it will be found that the open- or short-circuited terminations of the delay network are chosen in accordance with the need for maintaining a given polarity or for reversing the polarity at the particular termination. The choice between these alternatives depends on whether the round-trip delay of the network is a full period or half period of the line-synchronizing pulses. In the former case polarity maintenance is desirable, while in the latter a polarity reversal at the remote end of the network is desirable. The former arrangement is represented schematically in Fig. 4.

The embodiment of Fig. 4 includes a time-delay network which is effectively open circuited at at least one end and having a two-terminal negative-resistance device of the voltage-controlled type, providing a termination for that end. Except for that device, the separator is generally similar to that of Fig. 1 and corresponding components thereof are designated by the same reference characters. Preferably, both the near and far ends of the delay network are effectively on open circuit and, therefore, no resistors are connected across input terminals 32, 32 or output terminals 33, 33.

The negative-resistance device is located at the far end of the network and is in the form of a transitron circuit, including a pentode tube 60. The anode element of this tube is connected to a source of space current, shown as a battery 61, while the cathode is grounded through a self-biasing combination of a resistor 62 and by-pass condenser 63. The screen electrode is connected to a potential source 64 through a high resistor 65 while the suppressor is maintained negative relative to the screen by a bias battery 66 and a resistor 67. The screen and suppressor electrodes are coupled together for alternating-current potentials through a condenser 68. Another coupling condenser 69 connects the input terminals, namely terminal 70 and ground, of the negative-resistance device to output terminals 33, 33 of the time-delay network. The pulse-translating system of Fig. 4 may be substituted for unit 20 in Fig. 1 by connecting input terminal 71 of the former to the high-potential output terminal of separator 18 and by connecting to the synchronizing circuit of line-scanning generator 21, as indicated.

In adjusting the arrangement of Fig. 4 for effecting separation of line-frequency pulses of an applied composite television synchronizing signal, the parameters of network 30, 31 are chosen to provide a one-way delay equal to one-half of the time separation of succeeding line-frequency pulses. The expression "one-way delay" denotes the delay in signal translation from one termination to the other of the network.

The curve of Fig. 5 represents the variation of screen current with screen voltage of the transitron circuit. The portion of the characteristic between the ordinate lines $a$ and $b$ has a negative slope which is characteristic of negative-resistance devices. The circuit is adjusted to be operated within this range. The application of the composite synchronizing signal to amplifier 45 causes a line-frequency pulse of positive polarity to be applied to the near end of the time-delay network. After translation through the network, this pulse is delivered with the same polarity to the terminals of the negative-resistance device. The suppressor electrode is made more positive and redistributes the total space current of tube 60, decreasing the screen current but increasing the anode current. In other words, the transconductance between the suppressor and screen electrodes is negative, and the device in response to the applied pulse supplies power to the far end of the time-delay network. The amount of power supplied is under the control of the applied pulse and has the effect of regenerating the pulse. The regenerated pulse traverses the network in the direction of its near end 32, 32, arriving there in time coincidence with and with the same polarity as the next succeeding line-synchronizing pulse. Preferably, the regeneration is controlled in the manner described in connection with Fig. 1 so that the delayed image or regenerated pulse which traverses the network from its remote to its near end has slightly less amplitude on arriving at the near end than the original signal which provoked this image. To this extent, the operation of the intersynchronizing-signal separator of Fig. 4 increases the amplitude of the line-frequency pulses and thereby discriminates in favor of such pulses and against all others which are not harmonically related thereto.

The regenerative termination shown in Fig. 4 is generally similar to that described by C. Brunetti in an article entitled "The Clarification of Average Negative Resistance with Extensions of its Uses," Proceedings of the Institute of Radio Engineers, December 1937, pages 1595–1616, inclusive. In the December 1942 issue of the same publication at pages 542–546, C. Brunetti and L. Greenough disclose another suitable termination in an article entitled "Some Characteristics of a Stable Negative Resistance."

Each of the arrangements described and illustrated makes use of a regenerative time-delay network to increase the amplitude of pulse signals that recur with a fixed period. No corresponding increase in amplitude is received by pulse signals of any other period, not harmonically related to the selected fixed period. For this reason, a desired signal discrimination is realized. Additionally, the regenerative circuits may be selected to equalize any nonuniformity of delay network attenuation with frequency.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for translating recurring signal pulses having a given period and for distinguishing such pulses from signals not harmonically related thereto comprising: a multiple-reflecting time-delay network having a predetermined characteristic impedance and having a one-way delay equal to $1/n$ times said period, where $n$ is an even integer; an impedance device exhibiting negative-resistance properties, having a nominal value of impedance unequal to said characteristic impedance, and providing a termination at one end of said time-delay network for compensating, at least in part, signal attenuation therein; means for applying said recurring pulses to said network; and means coupled to said network for deriving an output signal including said recurring pulses with exalted amplitude.

2. A system for translating recurring signal pulses having a given period and for distingushing such pulses from signals not harmonically related thereto comprising: a multiple-reflecting time-delay network having near and remote ends, at least one of which is an open circuit, having a predetermined characteristic impedance and having a one-way delay equal to $1/n$ times said period, where $n$ is an even integer; an impedance device of the voltage-controlled type exhibiting negative-resistance properties, having a nominal value of impedance exceeding said characteristic impedance, and providing a regenerative termination at said one open-circuited end of said network for compensating, at least in part, signal attenuation therein; means for applying said recurring pulses to said near end of said network; and means coupled to said network for deriving an output signal including said recurring pulses with exalted amplitude.

MICHAEL J. DI TORO.

REFERENCES CITED

The following references are of record in the file of this patent:

UNITED STATES PATENTS

| Number | Name | Date |
|---|---|---|
| 2,211,942 | White | Aug. 20, 1940 |
| 2,236,134 | Gloess | Mar. 25, 1941 |
| 2,401,416 | Eaton et al. | June 4, 1946 |

FOREIGN PATENTS

| Number | Country | Date |
|---|---|---|
| 114,056 | Australia | Oct. 14, 1941 |